US012647828B2

(12) United States Patent
   Garcia Martin et al.

(10) Patent No.: US 12,647,828 B2
(45) Date of Patent: Jun. 2, 2026

(54) METHODS AND DEVICES FOR NEGOTIATING A POLICY IN TELECOMMUNICATION NETWORKS

(71) Applicant: Telefonaktiebolaget LM Ericsson (publ), Stockholm (SE)

(72) Inventors: Miguel Angel Garcia Martin, Pozuelo de Alarcon (ES); Antonio Iniesta Gonzalez, Madrid (ES); Ping Chen, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 457 days.

(21) Appl. No.: 18/249,894

(22) PCT Filed: Oct. 23, 2020

(86) PCT No.: PCT/CN2020/123071
   § 371 (c)(1),
   (2) Date: Apr. 20, 2023

(87) PCT Pub. No.: WO2022/082694
   PCT Pub. Date: Apr. 28, 2022

(65) Prior Publication Data
   US 2024/0007903 A1     Jan. 4, 2024

(51) Int. Cl.
   *H04W 28/08*     (2023.01)
   *H04W 28/18*     (2009.01)

(52) U.S. Cl.
   CPC ....... *H04W 28/0925* (2020.05); *H04W 28/18* (2013.01)

(58) Field of Classification Search
   CPC .......................... H04W 28/18; H04W 28/0925
   See application file for complete search history.

(56) References Cited

U.S. PATENT DOCUMENTS

2019/0297006 A1     9/2019     Colpo et al.
2020/0022027 A1     1/2020     Iwai et al.
(Continued)

FOREIGN PATENT DOCUMENTS

CN     107277793 A     10/2017
CN     107343294 A     11/2017
(Continued)

OTHER PUBLICATIONS

International Search Report and Written opinion dated Aug. 2, 2021 for International Application No. PCT/CN2020/123071 filed Oct. 23, 2020, consisting of 8-pages.
(Continued)

*Primary Examiner* — Joseph E Avellino
*Assistant Examiner* — Maryam Emadi
(74) *Attorney, Agent, or Firm* — Weisberg I.P. Law, P.A.

(57)     ABSTRACT

A method implemented by a first network node in a telecommunication network is provided. The method includes: determining whether a background data transfer, BDT, policy is to be applied to a first core network, a second core network or both; and in response to the BDT policy being to be applied to both the first core network and the second core network, transmitting, to a second network node, a request for negotiating a common BDT policy for both the first core network and the second core network. If the negotiated BDT policy is applicable to both the first and the second core networks, the applicability of the policy is independent of network coverage, UE support for 5G, availability of the 5G subscription, and whether the UE sessions are handled by the PCF or the PCRF.

20 Claims, 10 Drawing Sheets

(56)                    References Cited

U.S. PATENT DOCUMENTS

| | | | | |
|---|---|---|---|---|
| 2021/0168584 | A1* | 6/2021 | Li | H04W 8/065 |
| 2021/0337419 | A1* | 10/2021 | Alonso | H04W 28/0215 |
| 2022/0210702 | A1* | 6/2022 | Chen | H04W 60/04 |

FOREIGN PATENT DOCUMENTS

| | | |
|---|---|---|
| CN | 111225013 A | 6/2020 |
| WO | 2019/194954 A1 | 10/2019 |

OTHER PUBLICATIONS

3GPP TS 23.203 V16.2.0; 3rd Generation Partnership Project; Technical Specification Group Services and System Aspects; Policy and charging control architecture (Release 16), Dec. 2019, consisting of 267-pages.

3GPP TS 23.503 V16.4.1; 3rd Generation Partnership Project; Technical Specification Group Services and System Aspects; Policy and charging control framework for the 5G System (5GS); Stage 2 (Release 16), Apr. 2020, consisting of 115-pages.

Extended European Search Report dated May 14, 2024 issued in corresponding European Patent Application No. 20958276.6, consisting of 10 pages.

3GPP TSG-WG SA2 Meeting #135 Split, Croatia, Oct. 14-18, 2019; S2-1910123 (revision of S2-1909114); Change Request 23.503 CR 0327 rev 1 Current version: 16.2.0; Title: Correction on PCC Description; Source to WG: Huawei, HiSilicon; Source to TSG: SA2; Work Item Code: 5GS_Ph1, TEI16, consisting of 22 pages.

* cited by examiner

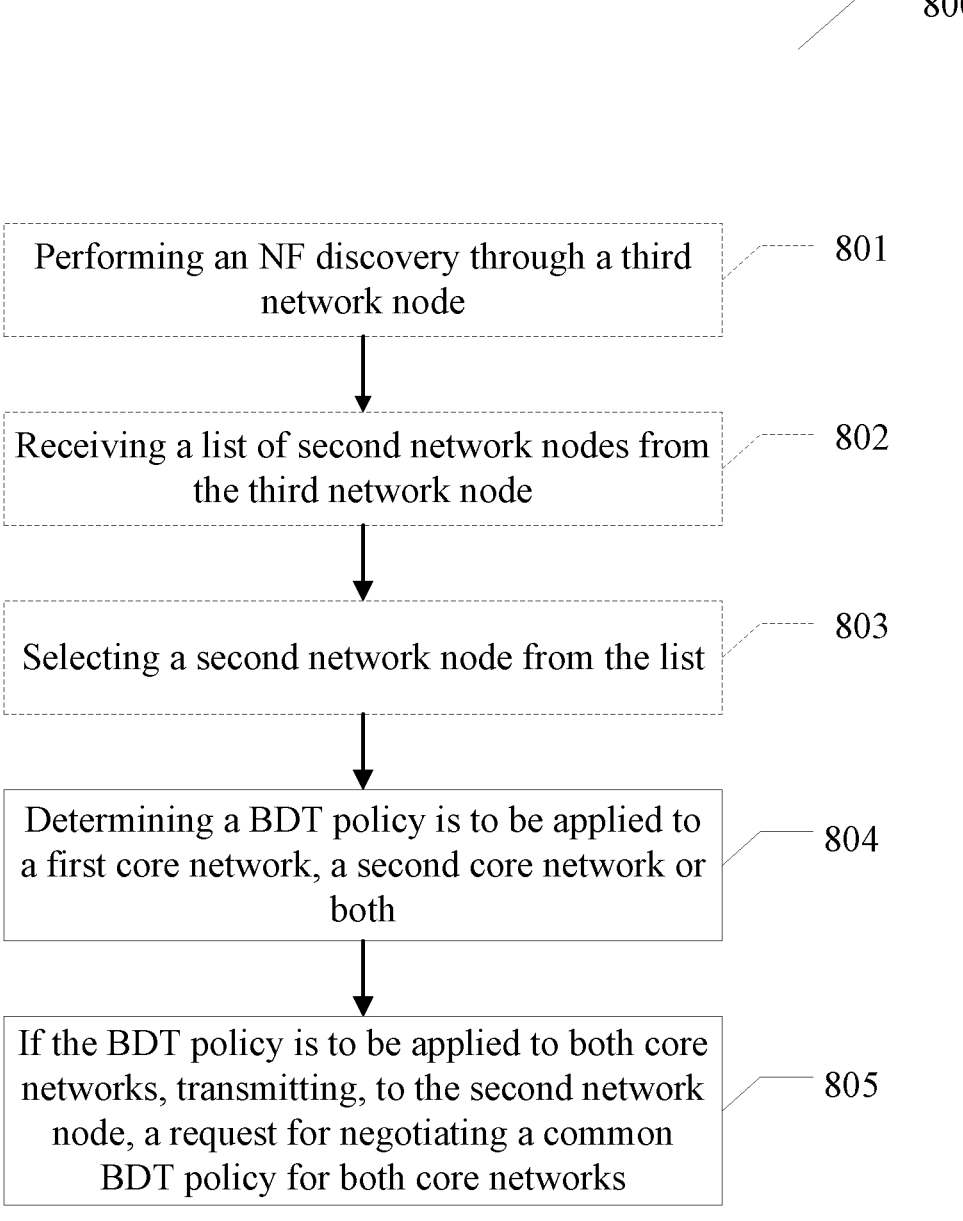

800

Performing an NF discovery through a third network node — 801

Receiving a list of second network nodes from the third network node — 802

Selecting a second network node from the list — 803

Determining a BDT policy is to be applied to a first core network, a second core network or both — 804

If the BDT policy is to be applied to both core networks, transmitting, to the second network node, a request for negotiating a common BDT policy for both core networks — 805

Fig. 8

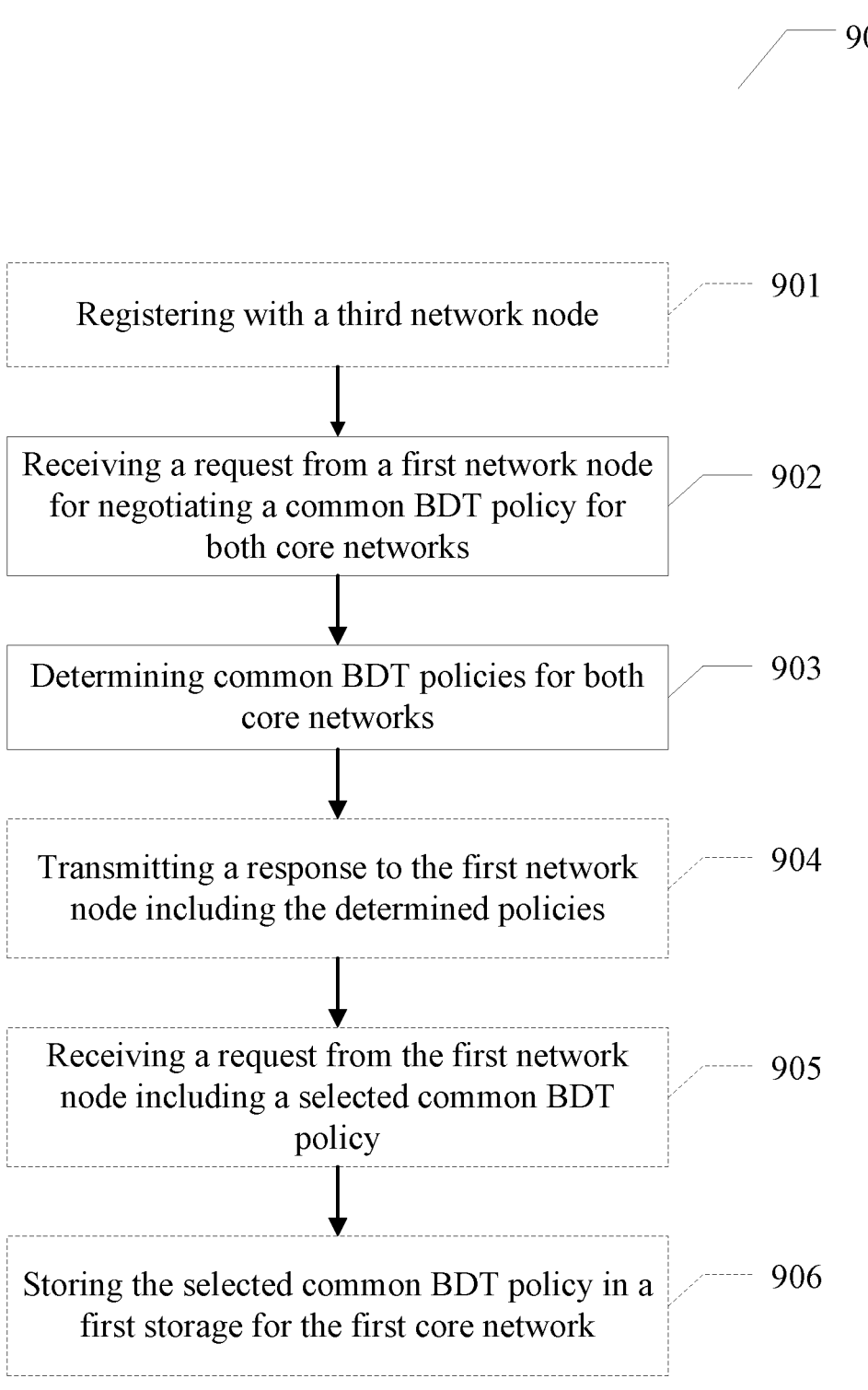

900

901

Registering with a third network node

902

Receiving a request from a first network node for negotiating a common BDT policy for both core networks

903

Determining common BDT policies for both core networks

904

Transmitting a response to the first network node including the determined policies

905

Receiving a request from the first network node including a selected common BDT policy

906

Storing the selected common BDT policy in a first storage for the first core network

METHODS AND DEVICES FOR NEGOTIATING A POLICY IN TELECOMMUNICATION NETWORKS

CROSS-REFERENCE TO RELATED APPLICATION

This application is a Submission Under 35 U.S.C. § 371 for U.S. National Stage Patent Application of International Application Number: PCT/CN2020/123071, filed Oct. 23, 2020 entitled "METHODS AND DEVICES FOR NEGOTIATING A POLICY IN TELECOMMUNICATION NETWORKS," the entirety of which is incorporated herein by reference.

TECHNICAL FIELD

The present disclosure generally relates to $5^{th}$ Generation Core (5GC) and Evolved Packet Core (EPC) networks, and more particularly to methods and devices for negotiating a policy in 5GC and EPC networks.

BACKGROUND

This section introduces aspects that may facilitate better understanding of the present disclosure. Accordingly, the statements of this section are to be read in this light and are not to be understood as admissions about what is in the prior art or what is not in the prior art.

During standardization of EPC, a service capability for transferring information exposure between the Policy Control Enforcement Function (PCRF) and the Application Function (AF) is defined. In particular, this capability enables negotiation between the AF and the PCRF about the recommended time window(s) and the related conditions (e.g., volume of data to be transferred per user equipment (UE), expected amount of UEs, a desired time window and optionally, network area information, etc.) for future Background Data Transfer (BDT).

In EPC, the term "Application Server (AS)" is used to refer to what calls an AF. Hereinafter the terms AS and AF are used interchangeably.

A procedure for negotiating a BDT policy in EPC is illustrated in FIG. 1. An AF communicates with a Service Capability Exposure Function (SCEF), which in turn communicates with a PCRF in the home network, requesting operational parameters of the policy (e.g., the time window, the volume of data to be transferred per UE, the expected amount of UEs, the desired time window and optionally, the network area information (such as a list of cell identifiers (IDs), tracking areas, routing Areas), etc.). The PCRF, after retrieving from a storage any potential existing policies for BDT, accepts or rejects suggested parameters, and returns acceptable transfer policies to the SCEF, and then the SCEF forwards them to the AF.

A transfer policy consists of a recommended time window for the BDT, a reference to a charging rate for this time window and optionally a maximum aggregated bitrate. Typically, AFs use the BDT negotiation process to negotiate bulk data transfer during night periods at discounted rates.

It is possible that the PCRF generates more than one acceptable transfer policy, in which case, step 6 of FIG. 1 includes all of these acceptable transfer policies. The AF receives them, selects one of these transfer policies, returns it to the SCEF, as shown in step 8. At step 9, the SCEF forwards the selected transfer policy to the PCRF, which stores it in a Subscription Policy Repository (SPR) at step 12.

When the $5^{th}$ generation of cellular networks is standardized, the procedure for negotiation of the BDT policy may be adapted from EPC to 5GC. As such, the role of the PCRF is played by a Policy Control Function (PCF), and the role of the SCEF is played by a Network Exposure Function (NEF).

A procedure for negotiation of the BDT policy in 5GC as illustrated in FIG. 2 is similar in almost all of the steps to that in EPC.

When the AF (or the AS) wants to activate a BDT policy, it communicates with either the SCEF or the NEF, depending on whether support is granted for EPC or 5GC, respectively. FIG. 3 illustrates a high-level procedure for activation of a previously negotiated BDT policy for EPC.

When connection between the AF and UE is established, the AF may request to become a chargeable party for a session to be set up by transmitting a set chargeable party request (which may include an AF ID, description of application flows, sponsor information, sponsoring status, a BDT reference ID, and optionally a usage threshold) to the SCEF at step 1. The sponsoring status indicates whether sponsoring is started or stopped, i.e. whether a $3^{rd}$ party service provider is the chargeable party or not. The BDT reference ID parameter identifies a previously negotiated transfer policy for the BDT. The SCEF assigns a T8 Long Term Transaction Reference ID (TLTRI) to the set chargeable party request.

At step 2, the SCEF authorizes the AF request to sponsor application traffic and stores the sponsor information together with the AF ID and the TLTRI. If the authorization is not granted, step 3 will be skipped and the SCEF replies to the AF with a result value indicating that the authorization has failed.

At step 3, the SCEF interacts with the PCRF by triggering a PCRF initiated IP-CAN session modification, and provides IP filter information, sponsored data connectivity information, a BDT reference ID (if received from the AF) and sponsoring status (if received from the AF) to the PCRF.

At step 4, the SCEF transmits a set chargeable party response message (which may include TLTRI, the result, etc.) to the AF. The result indicates whether the request is granted or not.

FIG. 4 illustrates a procedure for activation of the BDT policy in 5GC. This procedure is similar in nature to that shown in FIG. 3 for EPC.

A notion of a combined SCEF+NEF network function (NF) is introduced, which implements both EPC interfaces such as T8, Gw, Gwn, etc. and 5GC interfaces such as Nnef, Nudm, Namf, Nsmf, Nudr, etc. The combined SCEF+NEF NF is a union of the SCEF and the NEF.

In order to understand the problems that arise with interworking and coexistence of EPC and 5GC, a short introduction of relevant aspects of the interworking and coexistence is provided. A UE may be governed by a subscription to the EPS (4G) or a subscription to the 5GS (5G). These subscriptions are, in principle, independent of each other, even for the same identity (e.g., International Mobile Subscriber Identity (IMSI)).

A UE that has the 4G subscription may typically attach to EPC (for 2G, 3G and 4G coverage). A Packet Data Network (PDN) session of the UE is handled by a PDN-GW (Packet Data Network-Gateway) and controlled by a PCRF. However, a UE that has the 5G subscription may offer two possibilities from the point of view of attachment to the network. The possibility may be selected by the network based on subscription information, a local policy, UE capabilities, Radio Access Network (RAN) coverage, network performance, etc. When the UE attaches to 5GC, a Session Management Function (SMF) and a User Plane Function (UPF) handle the PDU session of the UE governed by the PCF. When the UE attaches to EPC, the PDN-GW handles the PDN connection of the UE governed by the PCRF.

Although the procedures for negotiation of the BDT policy are quite similar between EPC and 5GC, especially if we assume the combined SCEF+NEF NF, some problems still arise.

It is expected that many of the UEs may preferably access 5GC. However, 5GC may not be deployed unanimously across any whole Public Land Mobile Network (PLMN). For many years there would be islands of coverage of 5G with backup in existing LTE/EPC. Therefore, some types of coexistence between 5GC and EPC may be expected.

It is desired that an AF performs a single negotiation of the BDT policy towards the combined SCEF+NEF node via a common Application Programming Interface (API) for both 4G and 5G networks and the underlying network topology is hidden from the AF/AS. Currently, there is no standardized solution for performing this common negotiation.

Furthermore, a problem may arise in a scenario in which assuming that the AF negotiates two different BDT policies for the same service, one for EPC and the other for 5GC and assuming that the time windows of both BDT policies are different, when it is time for applying the BDT policy for EPC, the AF cannot control whether the UE, in its current location, is under EPC or 5GC coverage. Since network selection is mostly done by the network itself and depends on network configuration, UE subscription (5G or legacy), coverage and performance, neither the AF nor the UE can steer the selection of an advantageous network. Therefore, it would be possible that when the UE gets attached to 5GC, the BDT policy does not apply to so the UE will be charged at a normal rate instead of a discounted one. It is also possible that if the AF activates both the BDT policy for EPC and the BDT policy for 5GC, a UE may benefit from these policies twice, if it happens that the UE is connected to EPC and 5GC at the time these polices are active.

When the combined SCEF+NEF NF receives a request from an AF for a BDT negotiation, since the SCEF+NEF is a combined NF with reference points towards both the PCRF and the PCF, it may negotiate the BDT policies with each of them. However, this negotiation does not currently provide the AF with sufficient deterministic information that enables the AF to select the most advantageous policy.

SUMMARY

It is an object of the present disclosure to provide a common network exposure process allowing the AF/AS to invoke the common API towards both the 4G and 5G networks and hide the underlying network topology, regardless of whether the UEs are anchored on either the 4G or 5G network.

According to a first aspect of the present disclosure, a method implemented by a first network node in a telecommunication network is provided. The method comprises: determining whether a background data transfer, BDT, policy is to be applied to a first core network, a second core network or both; and in response to the BDT policy being to be applied to both the first core network and the second core network, transmitting, to a second network node, a request for negotiating a common BDT policy for both the first core network and the second core network.

In an alternative embodiment of the first aspect, the determination may be based on an affected network indicator included in a negotiation create request from an application function.

In a further alternative embodiment of the first aspect, the request transmitted from the first network node to the second network node may include the affected network indicator.

In another further alternative embodiment of the first aspect, if the negotiation create request does not include the affected network indicator, it may be determined that the BDT policy is to be applied to both the first core network and the second core network.

In another alternative embodiment of the first aspect, prior to transmitting the request for negotiating with the second network node, the method may further comprise: performing a network function discovery by means of a third network node; receiving from the third network node a list of second network nodes having registered with the third network node; and selecting a second network node from the list.

In an alternative embodiment of the first aspect, the third network node may be a network repository function, NRF, node.

In an alternative embodiment of the first aspect, the first core network may be a $5^{th}$ generation core network and the second core network may be an evolved packet core network.

In an alternative embodiment of the first aspect, the first network node may be a service capability exposure function node or a network exposure function node, and the second network node may be a common BDT negotiation network function node.

According to a second aspect of the present disclosure, a method implemented by a second network node in a telecommunication network is provided. The method comprises: receiving a background data transfer, BDT, policy control create request from a first network node for negotiating a common BDT policy for both including an affected network indicator indicating that a BDT policy is to be applied to both a first core network and a second core network; and determining common BDT policies for both the first core network and the second core network.

According to a third aspect of the present disclosure, a method implemented in a telecommunication network is provided. The telecommunication system comprises a first network node, a second network node and a third network node. The method comprises steps of: the method according to the above first aspect; the method according to the above second aspect; receiving, at the third network node from the first network node, a network function discovery request for the second network node for negotiating a common background data transfer, BDT, policy for both a first core network and a second core network; and transmitting, from the third network node to the first network node, a list of second network nodes.

According to a fourth aspect of the present disclosure, a first network node in a telecommunication network is provided. The first network node comprises a processor and a memory communicatively coupled to the processor. The memory is adapted to store instructions which, when executed by the processor, cause the first network node to perform operations of the method according to the above first aspect.

According to a fifth aspect of the present disclosure, a second network node in a telecommunication network is provided. The second network node comprises a processor and a memory communicatively coupled to the processor. The memory is adapted to store instructions which, when executed by the processor, cause the second network node to perform operations of the method according to the above second aspect.

According to a sixth aspect of the present disclosure, a telecommunication system is provided. The telecommunication system comprises: a first network node according to the above fourth aspect; a second network node according to the above fifth aspect communicating with at least the first network node; and a third network node participating in the method according to the above third aspect and communicating with at least the first network node and the second network node.

According to a seventh aspect of the present disclosure, a non-transitory computer readable medium having a computer program stored thereon is provided. When the computer program is executed by a set of one or more processors of the first network node, the computer program causes the first network node to perform operations of the method according to the above first aspect.

According to an eighth aspect of the present disclosure, a non-transitory computer readable medium having a computer program stored thereon is provided. When the computer program is executed by a set of one or more processors of the second network node, the computer program causes the second network node to perform operations of the method according to the above second aspect.

In the present disclosure, the AF may perform single BDT negotiation and activation processes for a set of UEs, but the negotiated BDT policy is applicable to EPC, 5GC or both networks, as indicated in the AF request. If the negotiated BDT policy is applicable to both 5GC and EPC, the applicability of the policy is independent of network coverage, UE support for 5G, availability of the 5G subscription, and whether the UE sessions are handled by the PCF or the PCRF.

BRIEF DESCRIPTION OF THE DRAWINGS

The present disclosure may be best understood by way of example with reference to the following description and accompanying drawings that are used to illustrate embodiments of the present disclosure. In the drawings:

FIG. 8 is a flow chart illustrating a method implemented on a first network node according to some embodiments of the present disclosure;

FIG. 9 is a flow chart illustrating a method implemented on a second network node according to some embodiments of the present disclosure;

DETAILED DESCRIPTION

Figure 1:
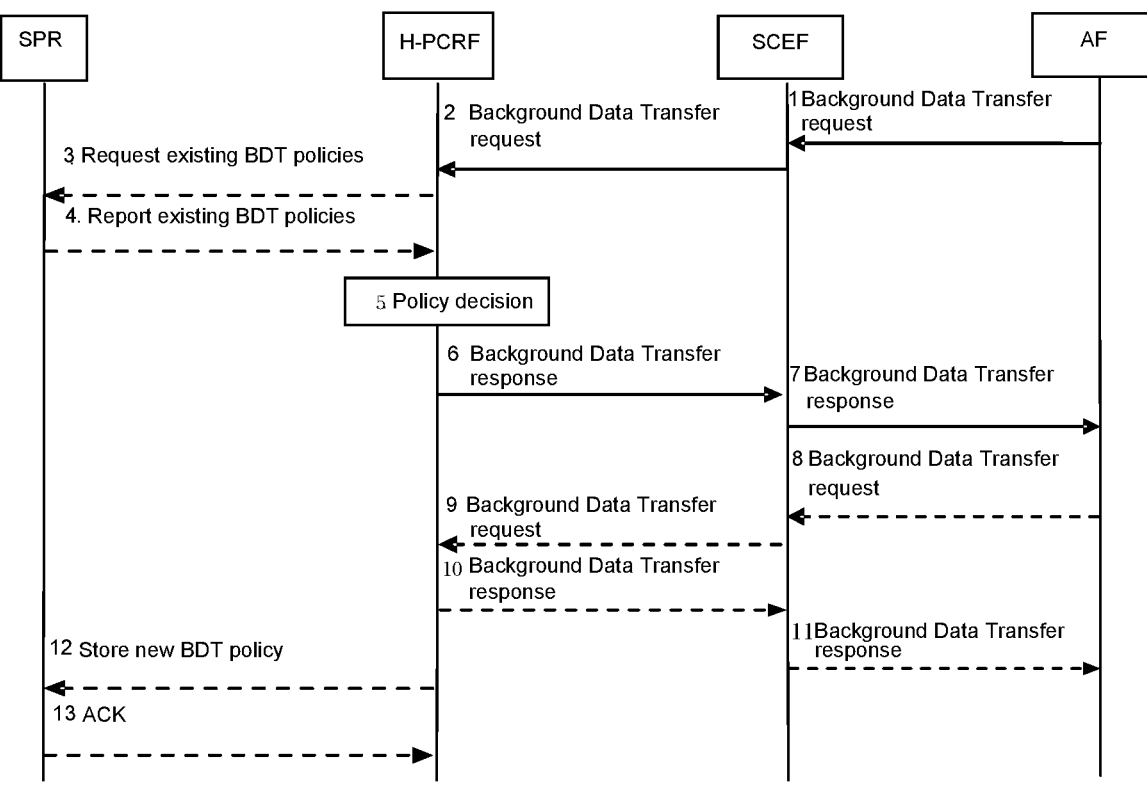
FIG. 1 is a sequence diagram illustrating a procedure for negotiation of a BDT policy in EPC.
Figure 2:
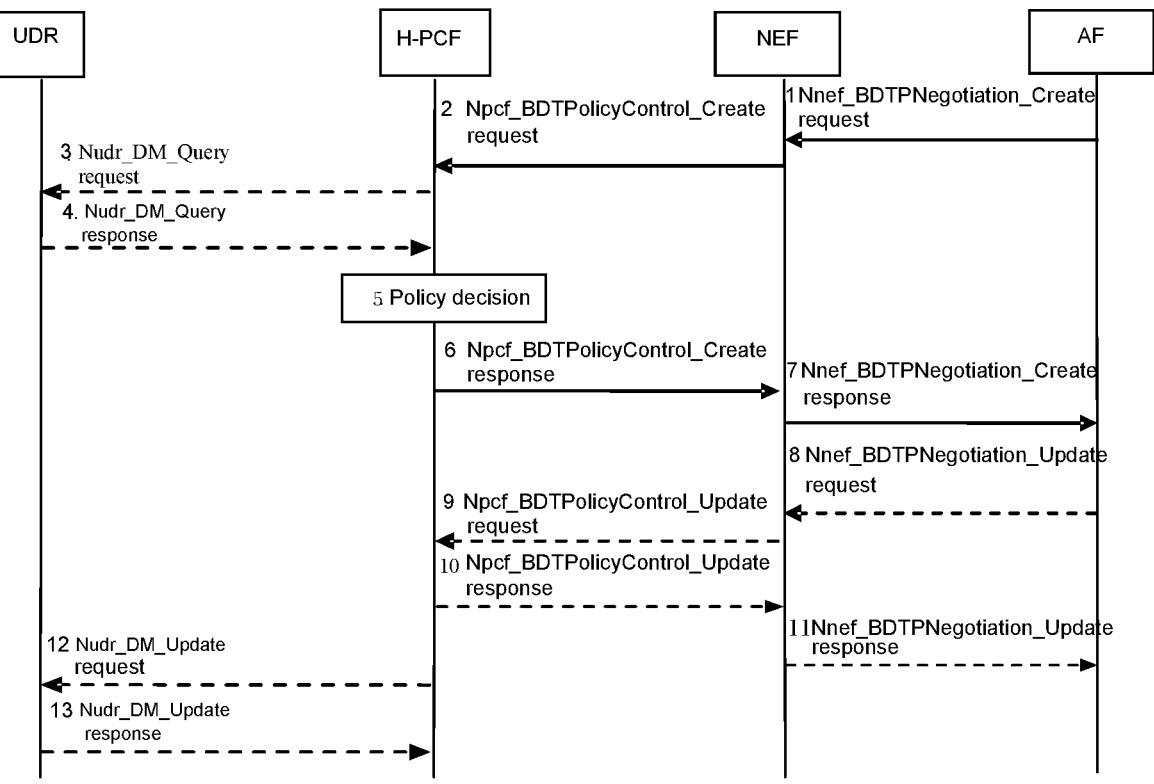
FIG. 2 is a sequence diagram illustrating a procedure for negotiation of a BDT policy in 5GC.
Figure 3:
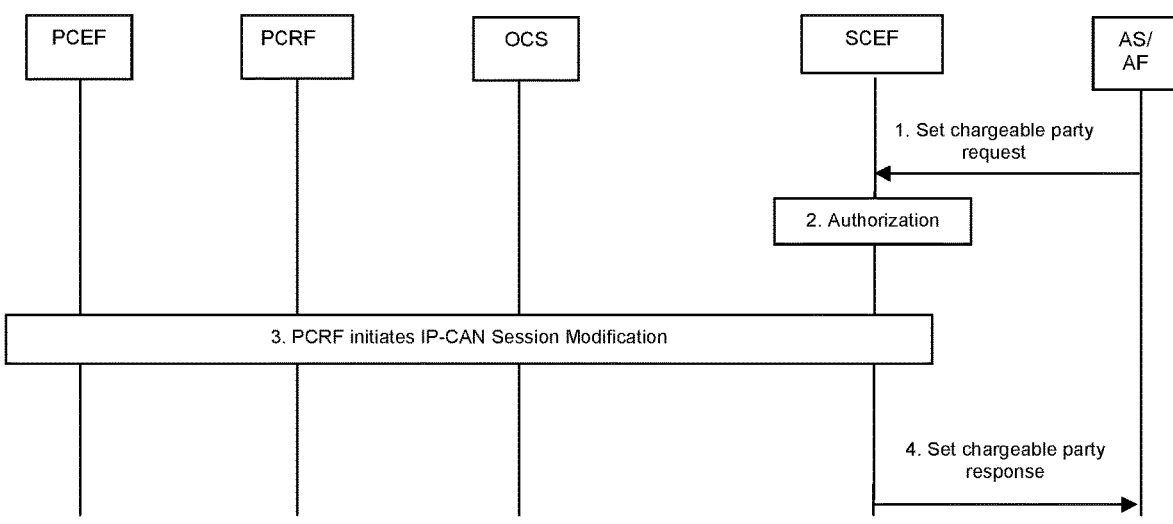
FIG. 3 is a sequence diagram illustrating a procedure for activation of a BDT policy in EPC.
Figure 4:
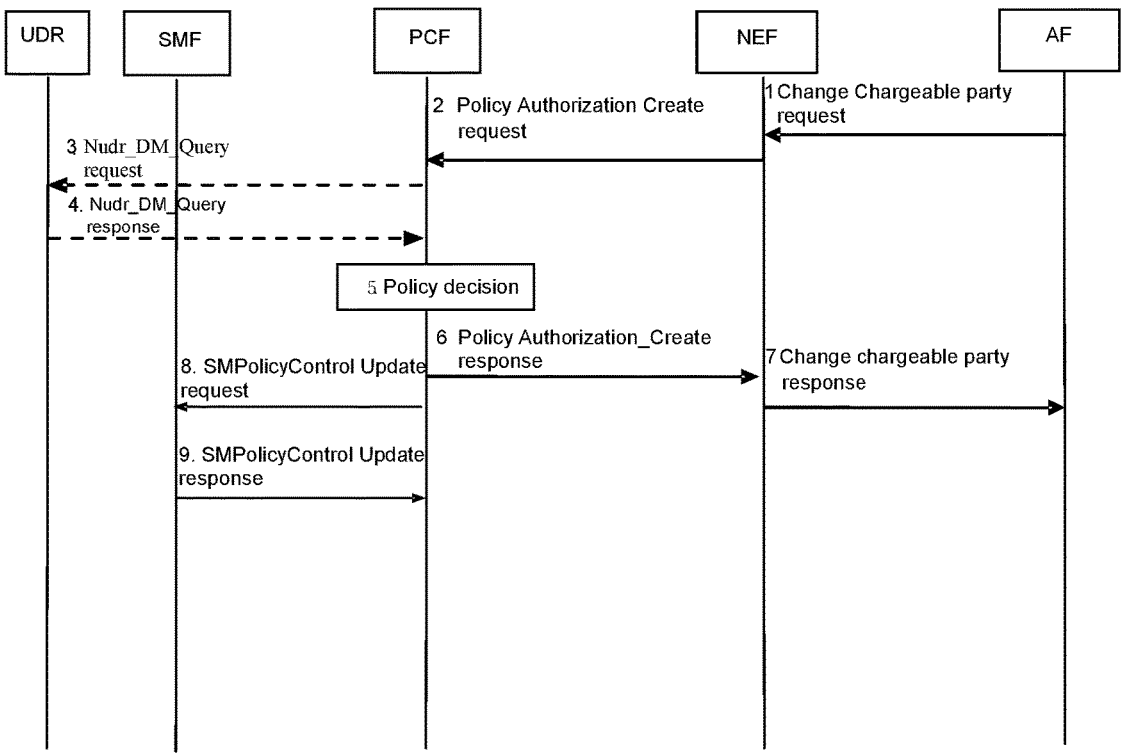
FIG. 4 is a sequence diagram illustrating a procedure for activation of a BDT policy in 5GC.

The following detailed description describes methods and devices for negotiating a policy in 5GC and EPC networks. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interfaces to establish network connections (to transmit and/or receive code and/or data using propagating signals) with other electronic devices. One or more parts of an embodiment of the present disclosure may be implemented using different combinations of software, firmware, and/or hardware.

A method for coordinating negotiation of a BDT policy for one or more UEs is provided, in which the negotiation takes place between an AF and an SCEF+NEF in a PLMN network comprising 5GC and EPC. For the AF, the negotiation and subsequent activation of the BDT policy may be performed transparently, regardless of whether the AF communicates with an NEF in 5GC through the Nnef reference point or communicates with an SCEF in EPC through the T8 reference point. The negotiation may also be irrespective of whether the UEs to which the negotiated BDT policy applies attach to EPC or 5GC.

The method may provide an opportunity for the AF to indicate whether the BDT policy under negotiation should be applicable to EPC, or both, just using a single interface from the AF to the SCEF+NEF (either T8 or Nnef). Allowing the AF to indicate its desire for the BDT policy to apply to just one core, such as EPC or 5GC, rather than both at the same time, may be advantageous. For example, if the UEs to which the BDT policy applies only support one network (either EPC or 5GC) with the BDT policy being negotiated with respect the requested network, it may provide more suitable time windows, charging rates, data volumes, etc. than the case that the BDT policy would need to apply to both 5GC and EPC.

If the AF does not indicate a preference for the network to which the BDT policy should be applicable, a default indication may be considered. The operator of the PLMN may configure a default indication behavior in the SCEF+NEF. For example, the PLMN operator may configure the BDT policy negotiation for a given AF to be applicable, by default, to both 5GC and EPC.

The method may be based on a definition of a new combined entity: a Common BDT Negotiation NF, which may be tasked for negotiating a BDT policy that is commonly applicable to 5GC and EPC.

When the SCEF+NEF receives a request from the AF for negotiating a BDT policy, the SCEF+NEF may check the indication of applicability to the policy (EPC, 5GC or both networks), if present (if absent, the default indication may be employed). Depending on the indication of applicability, the SCEF+NEF may contact a certain network function:

If the indication indicates that the BDT policy should be applicable to EPC, the SCEF+NEF may contact a PCRF in EPC.

If the indication indicates that the BDT policy should be applicable to 5GC, the SCEF+NEF may contact a PCF in 5GC.

If the indication indicates that the BDT policy should be applicable to both 5GC and EPC, the SCEF+NEF may contact the Common BDT Negotiation NF for negotiating a common BDT policy for both networks. The Common BDT Negotiation NF may implement the same interface for BDT negotiation as the PCF, i.e. Npcf_BDTPolicyControl.

The Common BDT Negotiation NF may organize the negotiation of the BDT policy in both 5GC and EPC, by accounting for e.g. usage predictions and network performance, sometimes obtained from a NetWork Data Analytics Function (NWDAF), UE traffic patterns, other BDT policies, geographical areas of deployment of UEs, volume of data to be transferred, etc. Finally, the Common BDT Negotiation NF may derive a common BDT policy that is applicable to both 5GC and EPC.

The Common BDT Negotiation NF may also be responsible for storing an agreed common BDT policy in a data storage. For this end, the Common BDT Negotiation NF may store the common BDT policy in a Unified Data Repository (UDR) using the Nudr interface. This interface may be extended so that the Common BDT Negotiation NF may instruct UDR to store a copy of the common BDT policy in a Subscription Profile Repository (SPR) to be at the disposal of any PCRF for EPC.

According to an embodiment, when the Common BDT Negotiation NF has determined a common BDT policy applicable to both 5GC and EPC, it may store it firstly in UDR of 5GC, and then in SPR of EPC. According to another embodiment, the Common BDT Negotiation NF may store the BDT policy in UDR and instruct UDR to replicate it in SPR. According to yet another embodiment, the Common BDT Negotiation NF may store the common BDT policy applicable to 5GC and EPC only once in UDR, and the PCRF may be enhanced with the Nudr interface towards UDR for retrieving BDT policies from UDR instead of SPR. In this case, the PCRF no longer interfaces with SPR for retrieving the BDT policies, but with UDR instead. The PCRF may retrieve the BDT policies from UDR using the Nudr interface when the UE is attached to EPC.

According to an embodiment, the Common BDT Negotiation NF may register with a Network Repository Function (NRF), also known as NF Repository Function (NRF), of 5GC, supplying a network profile which indicates that it is a new type identifier of network function. This allows other network functions, such as a common SCEF+NEF, to discover this Common BDT Negotiation NF, which is able to achieve a common negotiated BDT policy. Therefore, the AF may send a request to the common SCEF+NEF for negotiating a BDT policy. Assuming that the AF indicates that the result BDT policy should be applicable to both 5GC and EPC, the SCEF+NEF may query the NRF for discovering a Common BDT Negotiation NF. When discovering the Common BDT Negotiation NF, the SCEF+NEF may contact the Common BDT Negotiation NF and forward the request received from the AF. The Common BDT Negotiation NF may mark the BDT policy with a flag indicating that the BDT may be applicable to both 5GC and EPC.

According to an embodiment, the Common BDT Negotiation NF may be collocated or highly integrated with an PCF, hereby called an enhanced PCF, in which case, the enhanced PCF may register with the NRF to indicate support of a new common BDT negotiation feature. Specifically, the enhanced PCF may comprise a regular PCF and the Common BDT Negotiation NF. When the enhanced PCF registers with the NRF, it may signal that it is a regular PCF type of NF, and it may also signal the support for the common BDT negotiation feature. This allows interested NFs, such as the SCEF+NEFs, to differentiate, in the discovery phase, the enhanced PCF that support the common BDT negotiation from the regular PCFs which do not support it.

Distributed Common BDT Negotiation NF

According to an embodiment, the Common BDT Negotiation NF may be implemented in a distributed way. It may comprise a 5GC-Common BDT Negotiation NF for negotiating common BDT policy applicable to and an EPC-Common BDT Negotiation NF for negotiating common BDT policy applicable to EPC.

According to an embodiment, the 5GC-Common BDT Negotiation NF may be collocated or highly integrated with a PCF, and the EPC-Common BDT Negotiation NF may be collocated or highly integrated with a PCRF.

A new service interface may be defined between the 5GC-Common BDT Negotiation NF and the EPC-Common BDT Negotiation NF for coordinating a common BDT policy negotiation process when the BDT negotiation request is received from the SCEF+NEF indicating that the BDT policy should be applicable to both 5GC and EPC. According to this embodiment, the 5GC-Common BDT Negotiation NF may determine a number of candidate BDT policies that are applicable to 5GC. Then the BDT Negotiation NF may transmit these candidate BDT policies to the EPC-Common BDT Negotiation NF, which may determine their applicability to EPC. The EPC-Common BDT Negotiation NF may modify (typically reduce) the number of candidates or also parameters of each BDT policy so that they may become acceptable BDT policies for applicability to EPC. These modifications may include reducing the time windows where those BDT policies apply, modifying charging rates, reducing uplink or downlink bit rates, etc.

The EPC-Common BDT Negotiation NF may return these acceptable candidate BDT policies to the 5GC-Common BDT Negotiation NF. The BDT Negotiation NF may determine a final list of candidate common BDT policies applicable to both 5GC and EPC and interact with the AF. Once the final BDT policy is agreed with the AF, the BDT Negotiation NF may store the selected common BDT policy in UDR and communicate it to the EPC Common BDT Negotiation NF, which may store it in SPR.

In order to determine BDT policies, the 5GC-Common BDT Negotiation NF may determine a set of candidate BDT policies, taking into account local configuration associated with the AF or with traffic of their UEs, as well as usage predictions, sometimes obtained from the NWDAF, UE traffic patterns, other BDT policies, geographical areas of deployment of UEs, volume of data to be transferred, etc. The 5GC-Common BDT Negotiation NF may transmit this list of candidate BDT policies to the EPC Common BDT Negotiation NF, which may evaluate the applicability of those candidate BDT policies to EPC. Taking into account the candidate BDT policies, the local configuration associated with the AF or with the traffic of their UEs, other BDT policies in SPR and any other suitable information, the EPC-Common BDT Negotiation NF may determine a set of acceptable BDT policies and transmit a proposal of them to the 5GC-Common BDT Negotiation NF. Then, the 5GC-Common BDT Negotiation NF may determine an intersection of the candidate BDT policies and the acceptable BDT policies to create the proposed BDT policies common to both 5GC and EPC, and transmit them to the SCEF+NEF and further to the AF. The AF may reduce the list of proposed BDT policies to a single selected BDT policy.

Once the common BDT policy is stored and synchronized in each of UDR and SPR, irrespective of whether the UE session is handled by a PCF or PCRF, both the PCF and the PCRF can enforce the same negotiated conditions for the UE session upon AF activation.

Figure 5:
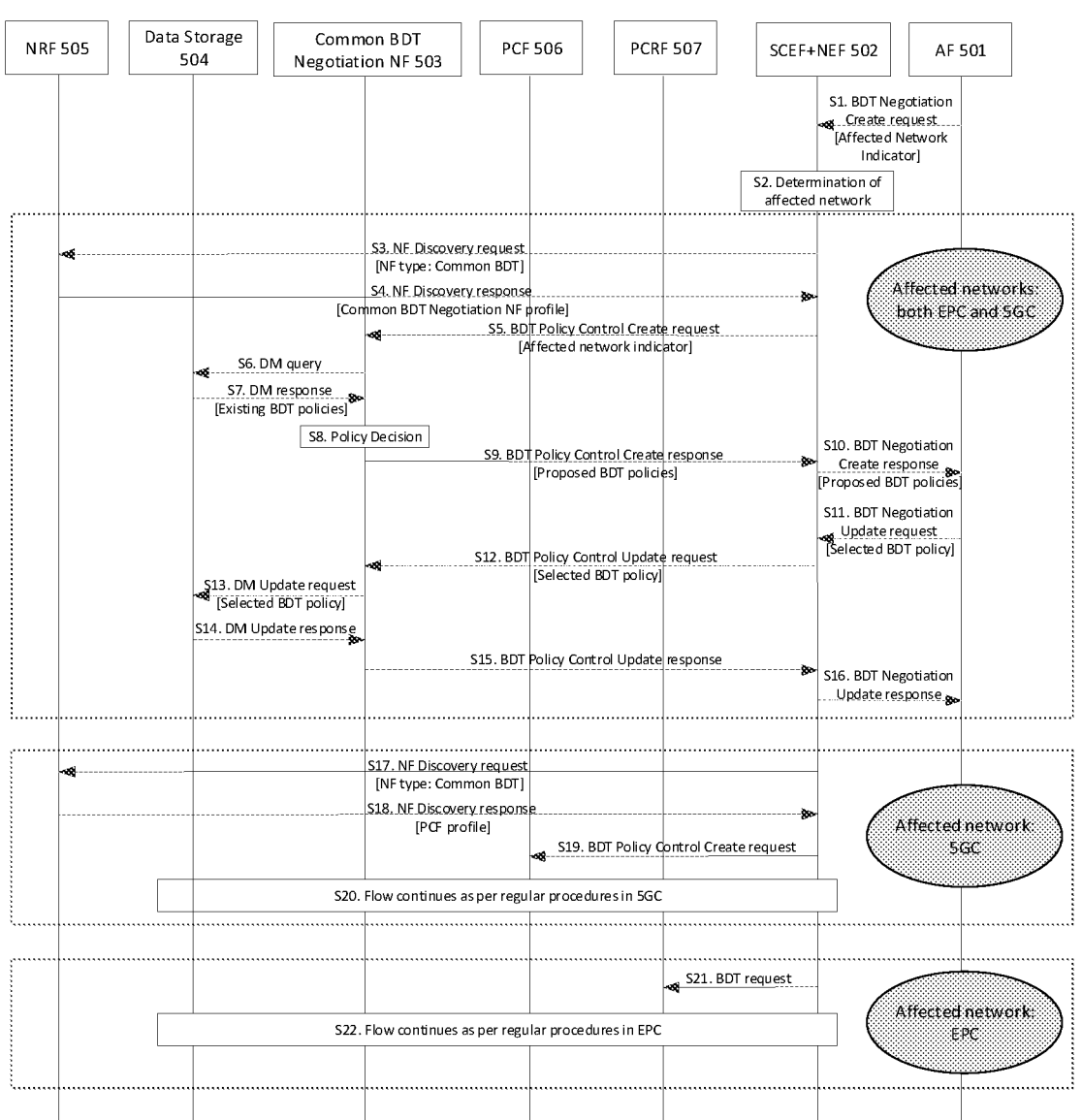
FIG. 5 is an exemplary sequence diagram illustrating a process for negotiation of a BDT policy according to some embodiments of the present disclosure.

FIG. 5 is an exemplary sequence diagram illustrating a process for negotiation of a BDT policy according to some embodiments of the present disclosure. A communication system as shown in FIG. 5 comprises at least an AF 501, an SCEF+NEF 502, a Common BDT Negotiation NF 503, a data storage 504, an NRF 505, a PCF 506 and a PCRF 507.

At step S1, the AF 501 may transmit a BDT Negotiation Create request to the SCEF+NEF 502. According to an embodiment, the AF 501 may include an affected network indicator that indicates a desire to apply the BDT policy to EPC, 5GC or both.

After receiving the request, at step S2, the SCEF+NEF 502 may examine the affected network indicator, determine the affected network, and decide which NF is to be a recipient of the message. If the request from the AF 501 does not include an affected network indicator, a default value may be applied, e.g., indicating that the BDT policy may be applicable to both 5GC and EPC.

If the affected networks are corresponding to both 5GC and EPC, the SCEF+NEF 502 may perform an NF discovery by means of the NRF 505 at step S3, e.g. by transmitting an NF Discovery request to the NRF 505 indicating that it is seeking a common BDT type of NF or an NF which supports the common BDT feature. At step S4, the NRF 505 may transmit a list of Common BDT Negotiation NFs registered with it to the SCEF+NEF 502. At step S5, the SCEF+NEF 502 may then select a Common BDT Negotiation NF 503 from the list and transmit to it a BDT Policy Control Create request which includes the affected network indicator and BDT parameters received from the AF 501.

At steps S6 and S7, the NF 503 may transmit a DM query to and receive a DM response from a data storage 504, e.g., UDR for 5GC or SPR for EPC. At step S8, the NF 503 may determine some proposed BDT policies. As an example, the NF 503 may organize the negotiation of the BDT policy in both 5GC and EPC, by accounting for e.g. usage predictions and network performance, sometimes obtained from an NWDAF, UE traffic patterns, other BDT policies, geographical areas of deployment of UEs, volume of data to be transferred, etc. At steps S9 and S10, the NF 503 may transmit the proposed BDT policies to the SCEF+NEF 502, which may forward them to the AF 501. As a response, at steps S11 and S12, the AF 501 may transmit back a selected BDT policy and the SCEF+NEF 502 may forward it to the NF 503. Then, at steps S13 and S14, the NF 503 may transmit a DM Update query for storing the selected BDT policy to and receive a DM Update response from the storage 504. At steps S15 and S16, the NF 503 may transmit an Update response to the SCEF+NEF 502 which may in turn transmit an Update response to the AF 501.

If the affected network is corresponding to 5GC, the SCEF+NEF 502 may discover a PCF 506 at steps S17 and S18, and transmit at step S19 a BDT Policy Control Create request to the PCF 506 indicating the BDT parameters from the AF 501 for policy negotiation.

If the affected network is corresponding to EPC, the 502 may transmit at step S21 a BDT request to a PCRF 507 indicating the BDT parameters from the AF 501 for policy negotiation.

Figure 6:
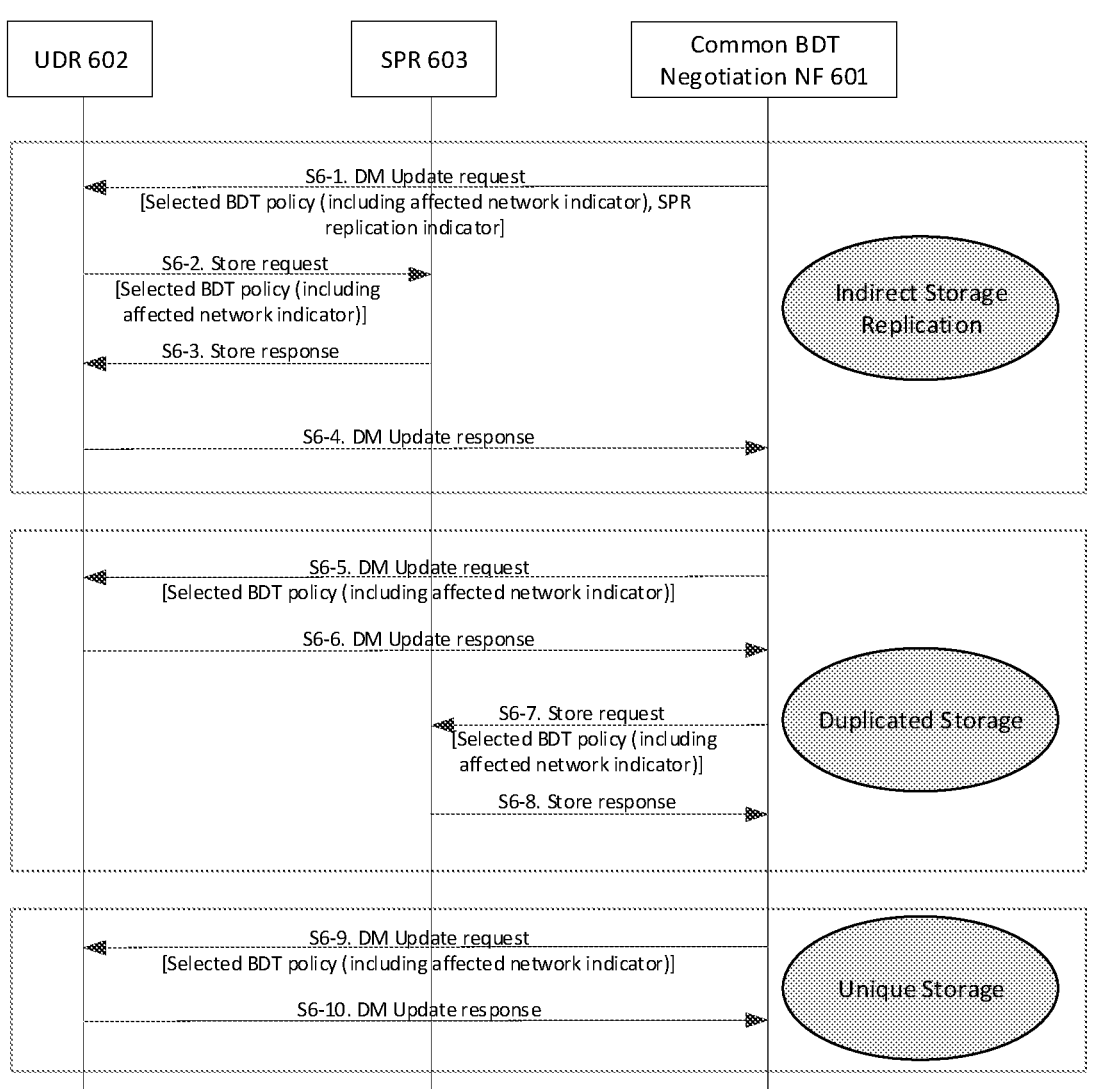
FIG. 6 is an exemplary sequence diagram illustrating data storage of common BDT policies according to some embodiments of the present disclosure.

FIG. 6 is an exemplary sequence diagram illustrating data storage of common BDT policies according to some embodiments of the present disclosure. For the sake of brevity, FIG. 6 only shows a Common BDT Negotiation NF 601, UDR 602 and SPR 603.

According to an embodiment related to indirect storage replication, the Common BDT Negotiation NF 601 may transmit a DM Update request to UDR 602 for 5GC at step S6-1. The message may include at least the selected BDT policy to be stored and an SPR replication indicator. The selected BDT policy may comprise an affected networks indicator that provides the PCF or PCRF with information on whether the policy applies to 5GC, EPC or both. Upon receipt of this request, at step S6-2, UDR 602 may locally store the selected BDT policy, and transmit a request to SPR 603 for EPC including the selected BDT policy to be stored. Therefore, in this embodiment, two copies of the common BDT policies exist, in which one is stored in UDR 602 and at the disposal of the PCF and the other is stored in SPR 603 and at the disposal of the PCRF. After receiving a response from SPR 603 at step S6-3, UDR 602 may transmit a DM Update response to the Common BDT Negotiation NF 601 at step S6-4.

According to an embodiment related to duplicated storage, the Common BDT Negotiation NF 601 may transmit a DM Update request to UDR 602 for 5GC at step S6-5. The message may include at least the selected BDT policy to be stored, which may comprise an affected networks indicator that provides the PCF or PCRF with information on whether the policy applies to 5GC, EPC or both. After storing the selected BDT policy, UDR 602 may transmit a response back at step S6-6. At steps S6-7 and S6-8, the Common BDT Negotiation NF 601 may communicate with SPR 602 in a similar way. Therefore, in this embodiment, two copies of the common BDT policies exist, in which one is stored in UDR 602 and at the disposal of the PCF and the other is stored in SPR 603 and at the disposal of the PCRF.

According to an embodiment related to unique storage, the Common BDT Negotiation NF 601 may store the selected BDT policy just in UDR 602 at step S6-9 and receive a response from UDR 602 at step S6-10. Therefore, in this embodiment, a single copy of the common BDT policies is stored in UDR. As such, both the PCF and the PCRF each have to implement an interface for retrieval of the BDT policies from UDR 602.

Figure 7:
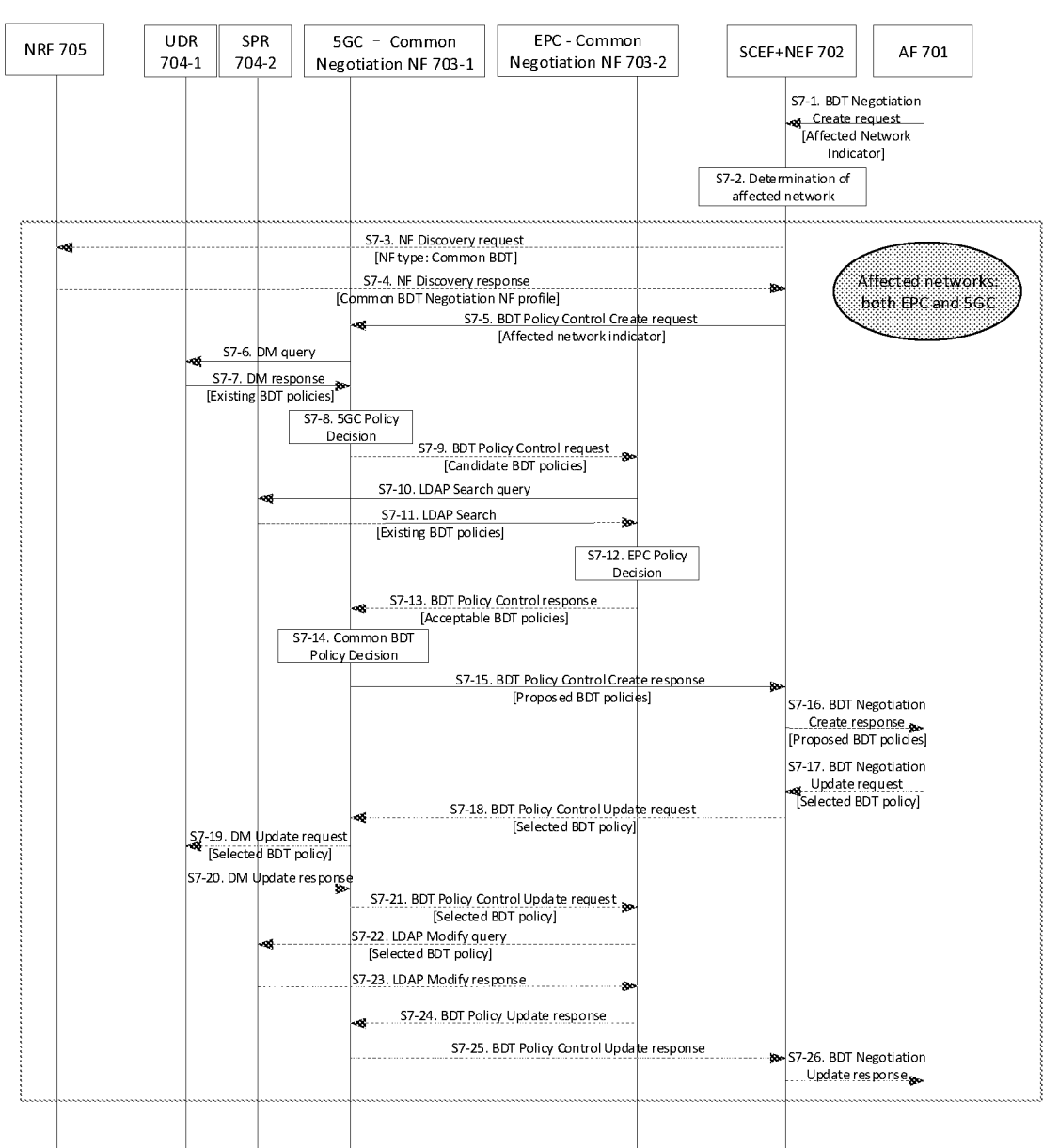
FIG. 7 is an exemplary sequence diagram illustrating distribution of the common BDT negotiation NF according to some embodiments of the present disclosure.

FIG. 7 is an exemplary sequence diagram illustrating distribution of the common BDT negotiation NF according to some embodiments of the present disclosure. The Common BDT Negotiation NF may be split into a 5GC-Common BDT Negotiation NF and an EPC-Common BDT Negotiation NF. In this case, a communication system as shown in FIG. 7 comprises at least an AF 701, an SCEF+NEF 702, a 5GC-Common BDT Negotiation NF 703-1, an EPC-Common BDT Negotiation NF 703-2, UDR 704-1, SPR 704-2 and an NRF 705. The 5GC-Common BDT Negotiation NF 703-1 may be responsible for coordinating the negotiation of the common BDT policy applicable to both EPC and 5GC, and for determining the BDT policies applicable to 5GC. The EPC-Common BDT Negotiation NF 703-2 may be responsible for determining the BDT policies applicable to EPC.

Many flows of FIG. 7 are similar to those of FIG. 5, which will not be described in detail, except for steps S7-9, S7-13, S7-21 and S7-24 performed between the 5GC-Common BDT Negotiation NF 703-1 and the EPC-Common BDT Negotiation NF 703-2.

At step S7-9, a request may be transmitted from the 5GC-Common BDT Negotiation NF 703-1 to the EPC-Common BDT Negotiation NF 703-2 for indicating a list of candidate BDT policies. The EPC-Common BDT Negotiation NF 703-2 may receive and analyze each of the candidate BDT policies, considering its applicability to EPC. For each candidate BDT policy, the EPC-Common BDT Negotiation NF 703-2 may propose a reduction in the terms of service (i.e., periods of time during which the policy is valid, different charging rates, etc.) or just discard the candidate. Alternatively, the EPC-Common BDT Negotiation NF 703-2 may propose alternative periods of time of applicability of the BDT policies. At step S7-13, the EPC Common BDT Negotiation NF 703-2 may transmit a corresponding response to the 5GC-Common BDT Negotiation NF 703-1 including acceptable BDT policies for applicability to EPC, together with the proposed terms of service (parameters that determine the applicability of the policy).

At step S7-21, a request may be transmitted from the 5GC-Common BDT Negotiation NF 703-1 to the EPC-Common BDT Negotiation NF 703-2 for indicating the selected BDT policy. The EPC-Common BDT Negotiation NF 703-2 may receive this BDT policy and store it in SPR 704-2. Therefore, the selected BDT policy may become available at the disposal of the PCRF when the AF 701 activates the BDT policy. At step S7-24, the EPC Common BDT Negotiation NF 703-2 may transmit a corresponding response indicating a success or failure in processing the request.

According to an embodiment, for facilitating the operation and management of the Common BDT Negotiation NF, the 5GC-Common BDT Negotiation NF 703-1 may be collocated or highly integrated with an existing PCF, and the EPC-Common BDT Negotiation NF 703-2 may be collocated or highly integrated with an existing PCRF.

FIG. 8 is a flow chart illustrating a method 800 implemented on a first network node according to some embodiments of the present disclosure. As an example, operations of this flow chart may be performed by a combined SCEF+NEF, such as the SCEF+NEF 502 as shown in FIG. 5 or the SCEF+NEF 702 as shown in FIG. 7, but they are not limited thereto. The operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the first network node may firstly determine whether a BDT policy is to be applied to a first core network, a second core network or both of them (block 804). By way of example, the first core network may be 5GC and the second core network may be EPC. If the BDT policy is to be applied to both core networks, the first network node may transmit a request for negotiating a common BDT policy for both core networks to a second network node, e.g., the Common BDT Negotiation NF 503 as shown in FIG. 5 (block 805).

As an example, the determination as to whether the BDT policy is to be applied to the first core network, the second core network or both may be performed based on an affected network indicator from an AF, e.g., the AF 501 as shown in FIG. 5 or the AF 701 as shown in FIG. 7. The affected network indicator may be included in a Negotiation Create request transmitted from the AF to the first network node.

As a further example, the affected network indicator may be included in the request for negotiating the common BDT policy for both core networks from the first network node to the second network node.

As another example, if the Negotiation Create request from the AF does not contain such an affected network indicator, the first network node may determine by default that the BDT policy is to be applied to both core networks.

Specifically, the first network node may transmit a Discovery request to a third network node, e.g., an NRF such as the NRF 505 as shown in FIG. 5 or the NRF 705 as shown in FIG. 7, for performing an NF discovery (block 801). The first network node may then receive a list of second network nodes which previously registered with the third network node (block 802), and select the second network node from the list (block 803).

FIG. 9 is a flow chart illustrating a method 900 implemented on a second network node according to some embodiments of the present disclosure. As an example, operations of this flow chart may be performed by a Common BDT Negotiation NF such as the NF 503 as shown in FIG. 5 or the NF 601 as shown in FIG. 6 or a combination of the NFs 703-1 and 703-2 as shown in FIG. 7.

In one embodiment, the second network node may receive a BDT Policy Control Create request from a first network node, e.g., an SCEF+NEF, for negotiating a common BDT policy for both a first core network and a second core network (block 902). By way of example, the first core network may be 5GC and the second core network may be EPC. The second network node may determine common BDT policies for both core networks (block 903).

As an example, the BDT Policy Control Create request may include an affected network indicator which indicates that the common BDT policy is to be applied to both core networks.

As an example, the second network node may be collocated or integrated with a PCF.

As an example, the second network node may previously register with a third network node, e.g., an NRF, to indicate, to the first network node, a network function of the second network node or support of the second network node for negotiating the common BDT policy for both core networks (block 901) so that the first network node may select the second network node to transmit the BDT Policy Control Create request to this second network node.

As an example, the second network node may transmit a BDT Policy Control Create response to the first network node including the determined common BDT polices (block 904). The second network node may receive a BDT Policy Control Update request from the first network node including a selected common BDT policy (block 905), and store the selected common BDT policy in a first storage associated with the first core network, e.g., UDR 602 as shown in FIG. 6 or UDR 704-1 as shown in FIG. 7 (block 906).

In the case of indirect storage replication, the first storage may transmit a Store request including the selected common BDT policy to a second storage associated with the second core network, e.g., SPR 603 as shown in FIG. 6 or SPR 704-2 as shown in FIG. 7.

In the case of duplicated storage, in addition to storing a copy of the selected common BDT policy in the first storage, the second network node may store a copy of the selected common BDT policy in the second storage.

As an example, the second network node may transmit two separate requests to the first storage and the second storage, each of the two requests including a copy of the selected BDT policy.

In the case of unique storage, the copy of the selected BDT policy may only be stored in the first storage for retrieval by the PCF for the first core network and by the PCRF for the second core network.

As an example, in the case of distributed Common BDT Negotiation NF, the second network node may be considered as a combination of two network elements, e.g., the 5GC-Common BDT Negotiation NF 703-1 and the EPC-Common BDT Negotiation NF 703-2 as shown in FIG. 7. A first network element associated with the first core network may be responsible for communicating with the first network node, transmitting candidate BDT policies to a second network element associated with the second core network, receiving acceptable BDT policies from the second network element, and determining the common BDT policies.

Figure 10:
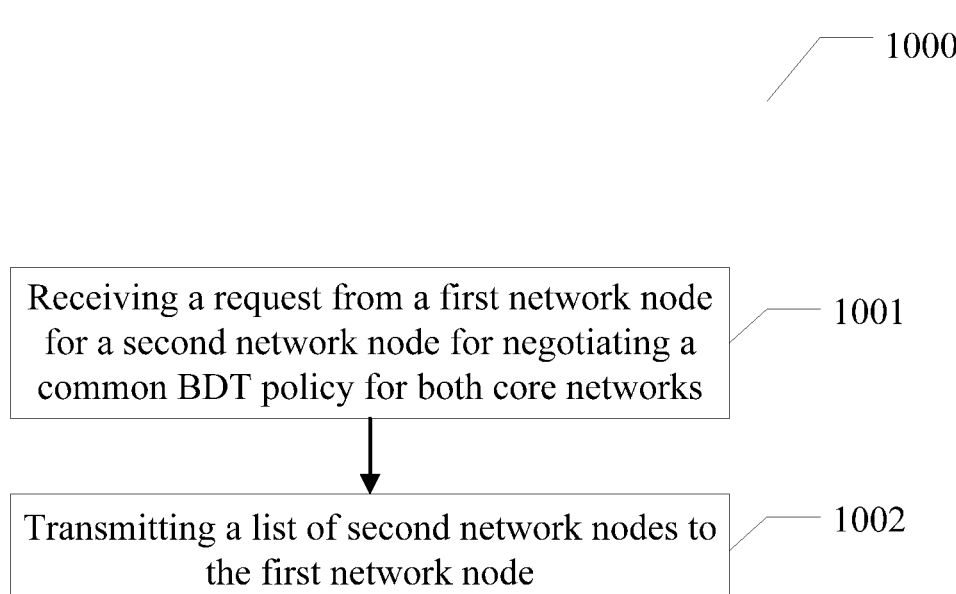
FIG. 10 is a flow chart illustrating a method implemented on a third network node according to some embodiments of the present disclosure.

FIG. 10 is a flow chart illustrating a method 1000 implemented on a third network node according to some embodiments of the present disclosure. As an example, operations of this flow chart may be performed by an NRF, such as the NRF 505 as shown in FIG. 5 or the NRF 705 as shown in FIG. 7.

In one embodiment, the third network node may receive, from a first network node (e.g., an SCEF+NEF), an NF Discover request for a second network node (e.g., a Common BDT Negotiation NF) to negotiate a BDT policy for both a first core network and a second core network (block 1001). By way of example, the first core network may be 5GC and the second core network may be EPC. The third network node may transmit a list of second network nodes to the first network node (block 1002).

As an example, the second network nodes included in the list may have previously registered with the third network node. As another example, each of the second network nodes included in the list may be integrated into a PCF which may have previously registered with the third network node.

Figure 11:
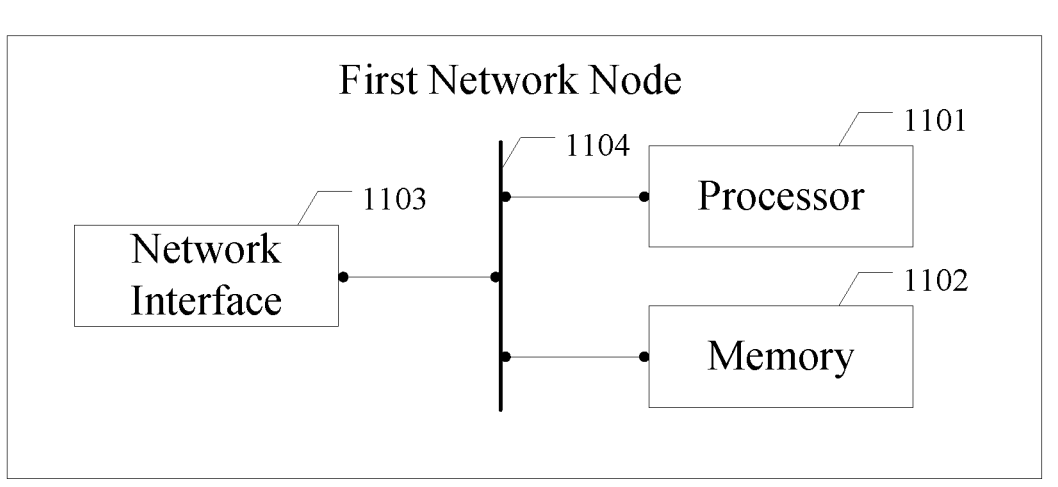
FIG. 11 is a block diagram illustrating a first network node according to some embodiments of the present disclosure.

FIG. 11 is a block diagram illustrating a first network node 1100 according to some embodiments of the present disclosure. As an example, the first network node 1100 may act as the SCEF+NEF 502 as shown in FIG. 5 or the SCEF+NEF 702 as shown in FIG. 7, but it is not limited thereto. It should be appreciated that the first network node 1100 may be implemented using components other than those illustrated in FIG. 11.

With reference to FIG. 11, the first network node 1100 may comprise at least a processor 1101, a memory 1102, a network interface 1103 and a communication medium 1104. The processor 1101, the memory 1102 and the network interface 1103 may be communicatively coupled to each other via the communication medium 1104.

The processor 1101 may include one or more processing units. A processing unit may be a physical device or article of manufacture comprising one or more integrated circuits that read data and instructions from computer readable media, such as the memory 1102, and selectively execute the instructions. In various embodiments, the processor 1101 may be implemented in various ways. As an example, the processor 1101 may be implemented as one or more processing cores. As another example, the processor 1101 may comprise one or more separate microprocessors. In yet another example, the processor 1101 may comprise an application-specific integrated circuit (ASIC) that provides specific functionality. In still another example, the processor 1101 may provide specific functionality by using an ASIC and/or by executing computer-executable instructions.

The memory 1102 may include one or more computer-usable or computer-readable storage medium capable of storing data and/or computer-executable instructions. It should be appreciated that the storage medium is preferably a non-transitory storage medium.

The network interface 1103 may be a device or article of manufacture that enables the first network node 1100 to send data to or receive data from other network nodes. In different embodiments, the network interface 1103 may be implemented in different ways. As an example, the network interface 1103 may be implemented as an Ethernet interface, a token-ring network interface, a fiber optic network inter-face, a network interface (e.g., Wi-Fi, WiMax, etc.), or another type of network interface.

The communication medium 1104 may facilitate communication among the processor 1101, the memory 1102 and the network interface 1103. The communication medium 1104 may be implemented in various ways. For example, the communication medium 1104 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 11, the instructions stored in the memory 1102 may include those that, when executed by the processor 1101, cause the first network node to implement the method described with respect to FIG. 8.

Figure 12:
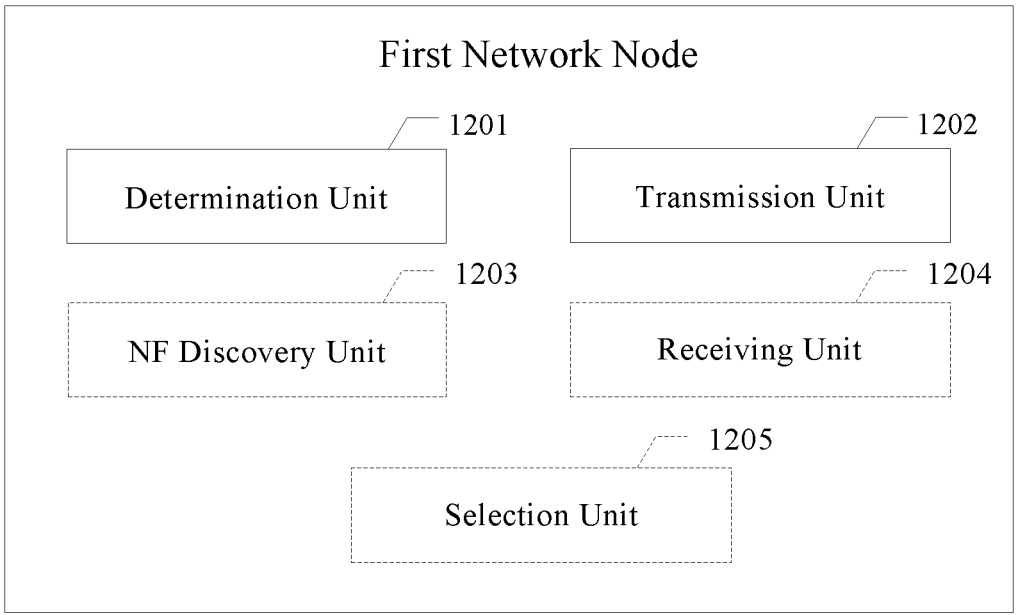
FIG. 12 is another block diagram illustrating a first network node according to some embodiments of the present disclosure.

FIG. 12 is another block diagram illustrating a first network node 1200 according to some embodiments of the present disclosure. As an example, the first network node 1200 may act as the SCEF+NEF 502 as shown in FIG. 5 or the SCEF+NEF 702 as shown in FIG. 7, but it is not limited thereto. It should be appreciated that the first network node 1200 may be implemented using components other than those illustrated in FIG. 12.

With reference to FIG. 12, the first network node 1200 may comprise at least a determination unit 1201 and a transmission unit 1202. The determination unit 1201 may be adapted to perform at least the operation described in the block 804 of FIG. 8. The transmission unit 1202 may be adapted to perform at least the operation described in the block 805 of FIG. 8.

In one embodiment, the first network node 1200 may further comprise an NF discovery unit 1203, a receiving unit 1204 and a selection unit 1205. The NF discovery unit 1203 may be adapted to perform at least the operation described in the block 801 of FIG. 8. The receiving unit 1204 may be adapted to perform at least the operation described in the block 802 of FIG. 8. The selection unit 1205 may be adapted to perform at least the operation described in the block 803 of FIG. 8

Figure 13:
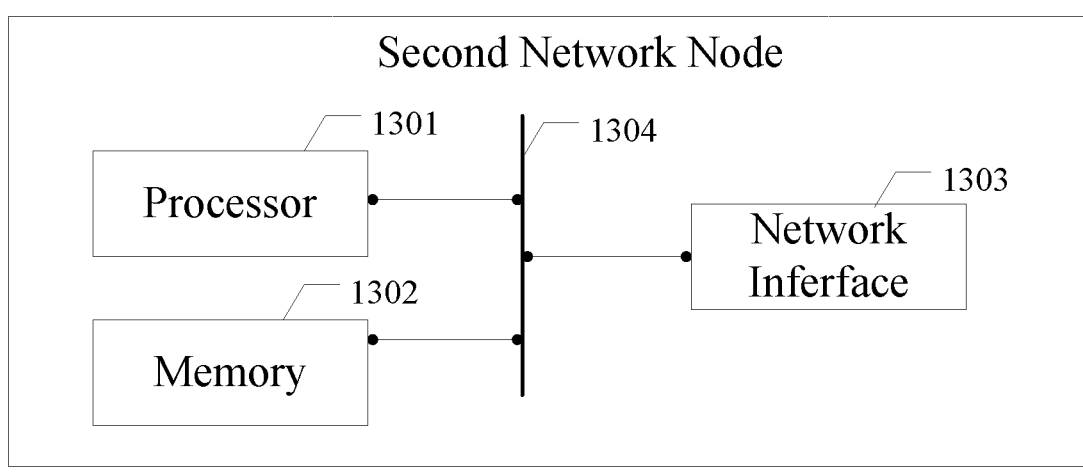
FIG. 13 is a block diagram illustrating a second network node according to some embodiments of the present disclosure.

FIG. 13 is a block diagram illustrating a second network node 1300 according to some embodiments of the present disclosure. As an example, the second network node 1300 may act as the NF 503 as shown in FIG. 5 or the NF 601 as shown in FIG. 6 or a combination of the NFs 703-1 and 703-2 as shown in FIG. 7. It should be appreciated that the second network node 1300 may be implemented using components other than those illustrated in FIG. 13.

With reference to FIG. 13, the second network node 1300 may comprise at least a processor 1301, a memory 1302, a network interface 1303 and a communication medium 1304.

The processor 1301, the memory 1302 and the network interface 1303 are communicatively coupled to each other via the communication medium 1304.

The processor 1301, the memory 1302, the network interface 1303 and the communication medium 1304 are structurally similar to the processor 1101, the memory 1102, the network interface 1103 and the communication medium 1104 respectively, and will not be described herein in detail.

In the example of FIG. 13, the instructions stored in the memory 1302 may include those that, when executed by the processor 1301, cause the second network node 1300 to implement the method described with respect to FIG. 9.

Figure 14:
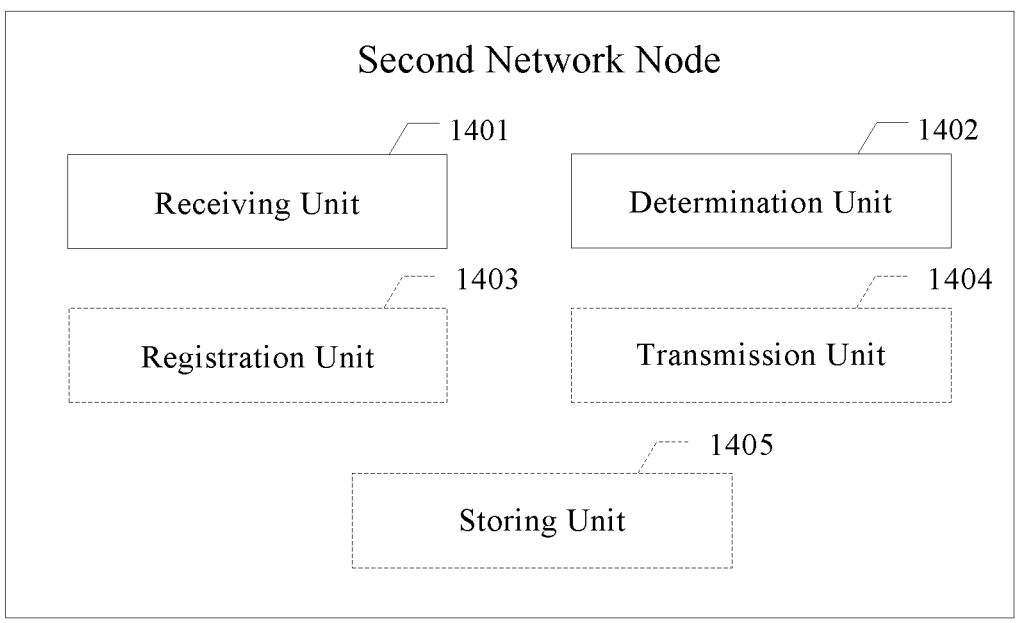
FIG. 14 is another block diagram illustrating a second network node according to some embodiments of the present disclosure.

FIG. 14 is another block diagram illustrating a second network node 1400 according to some embodiments of the present disclosure. As an example, the second network node 1400 may act as the NF 503 as shown in FIG. 5 or the NF 601 as shown in FIG. 6 or a combination of the NFs 703-1 and 703-2 as shown in FIG. 7. It should be appreciated that the second network node 1400 may be implemented using components other than those illustrated in FIG. 14.

With reference to FIG. 14, the second network node 1400 may comprise at least a receiving unit 1401 and a determination unit 1402. The receiving unit 1401 may be adapted to perform at least the operations described in the blocks 902 and 905 of FIG. 9. The determination unit 1402 may be adapted to perform at least the operation described in the block 903 of FIG. 9.

In one embodiment, the second network node 1400 may further comprise a registration unit 1403, a transmission unit 1404 and a storing unit 1405. The registration unit 1403 may be adapted to perform at least the operation described in the block 901 of FIG. 9. The transmission unit 1404 may be adapted to perform at least the operation described in the block 904 of FIG. 9. The storing unit 1405 may be adapted to perform at least the operation described in the block 906 of FIG. 9.

The units 1201-1205 and 1401-1402 are illustrated as separate units in FIGS. 12 and 14. However, this is merely to indicate that the functionality is separated. The units may be provided as separate elements. However, other arrangements are possible, e.g., some of them may be combined as one unit in each figure. Any combination of the units may be implemented in any combination of software, hardware, and/or firmware in any suitable location. For example, there may be more controllers configured separately, or just one controller for all of the components.

The units shown in FIGS. 12 and 14 may constitute machine-executable instructions embodied within a machine, e.g., readable medium, which when executed by a machine will cause the machine to perform the operations described. Besides, any of these units may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some units may be omitted altogether. Functionality and cooperation of these units are correspondingly described in more detail with reference to FIGS. 8-9.

Figure 15:
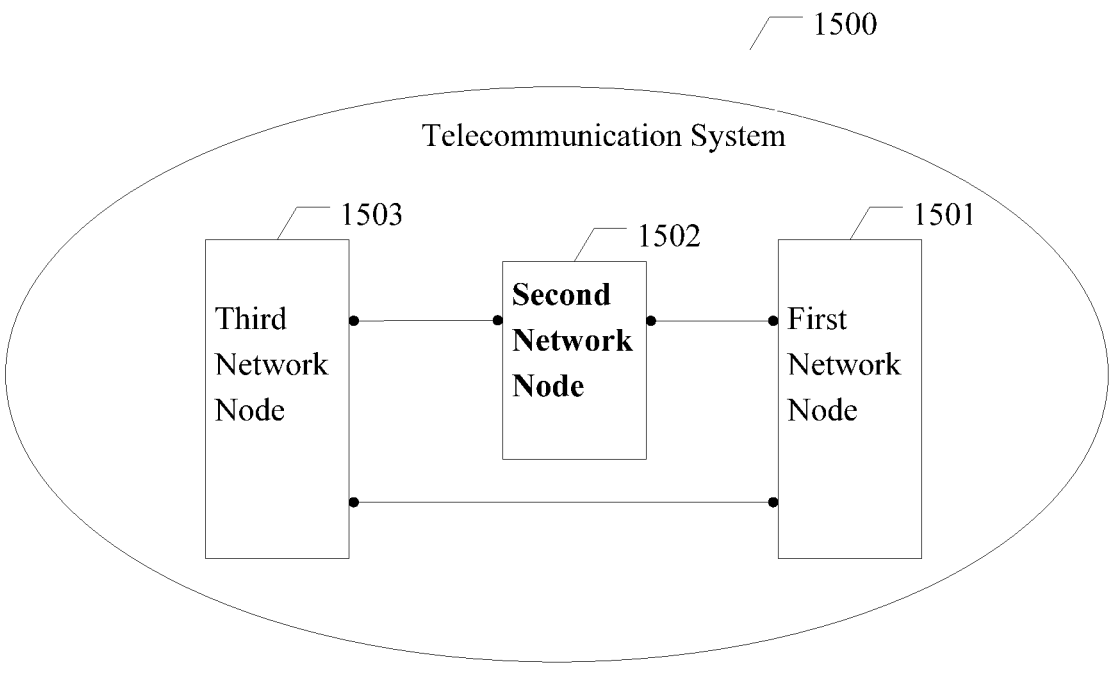
FIG. 15 is a block diagram illustrating a telecommunication system according to some embodiments of the present disclosure.

FIG. 15 is a block diagram illustrating a telecommunication system 1500 for negotiation of a BDT policy according to some embodiments of the present disclosure. The telecommunication system 1500 comprises at least a first network node 1501, a second network node 1502 and a third network node 1503. In one embodiment, the first and second network nodes 1501 and 1502 may act as the first network node 1100 or 1200 as depicted in FIG. 11 or 12 and the second network node 1300 or 1400 as depicted in FIG. 13 or 14, respectively, and the third network node 1503 may act as the third network node on which the method 1000 as shown in FIG. 10 is performed. In one embodiment, the first network node 1501, the second network node 1502 and the third network node 1503 may communicate with each other.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

The invention claimed is:

1. A method implemented by a first network node in a telecommunication network, the method comprising:
   determining that a background data transfer, BDT, policy is to be applied to both a first core network and a second core network; and
   in response to the BDT policy being determined to be applied to both the first core network and the second core network, transmitting, to a second network node, a request for negotiating a common BDT policy applicable to both the first core network and the second core network.

2. The method of claim 1, wherein the determination is based on an affected network indicator included in a negotiation create request from an application function.

3. The method of claim 2, wherein the request transmitted from the first network node to the second network node includes the affected network indicator.

4. The method of claim 2, wherein if the negotiation create request does not include the affected network indicator, it is determined that the BDT policy is to be applied to both the first core network and the second core network.

5. The method of claim 1, wherein prior to transmitting the request for negotiating with the second network node, the method further comprises:
   performing a network function discovery by means of a third network node;
   receiving from the third network node a list of second network nodes having registered with the third network node; and
   selecting a second network node from the list.

6. The method of claim 1, wherein the first core network is a $5^{th}$ generation core network and the second core network is an evolved packet core network.

7. The method of claim 1, wherein the first network node is a service capability exposure function node or a network exposure function node, and the second network node is a common BDT negotiation network function node.

8. A method implemented by a second network node in a telecommunication network, the method comprising:
   receiving a background data transfer, BDT, policy control create request from a first network node for negotiating a common BDT policy for both a first core network and a second core network; and
   determining common BDT policies applicable to both the first core network and the second core network.

9. The method of claim 8, wherein the BDT policy control create request received from the first network node includes an affected network indicator indicating that the common BDT policy is applicable to both the first core network and the second core network.

10. The method of claim 8, further comprising:

transmitting a BDT policy control create response to the first network node including the determined common BDT policies;

receiving a BDT policy control update request from the first network node including a selected common BDT policy; and storing the selected common BDT policy in a first storage for the first core network.

11. The method of claim 10, wherein the first storage transmits a store request to a second storage for the second core network including the selected common BDT policy.

12. The method of claim 10, wherein two store requests each including a copy of the selected BDT policy are transmitted from the second network node respectively to the first storage and a second storage for the second core network.

13. The method of claim 10, wherein only one copy of the selected BDT policy is transmitted from the second network node to the first storage for retrieval in both the first core network and the second core network.

14. The method of claim 8, wherein the second network node comprises a first network element associated with the first core network and a second network element associated with the second core network.

15. The method of claim 14, wherein the first network element is configured to communicate with the first network node, transmit candidate BDT policies to and receive acceptable BDT policies from the second network element, and determine the common BDT policies.

16. The method of claim 8, wherein the second network node is integrated into a policy control function node.

17. The method of claim 8, further comprising:

registering with a third network node to indicate, to the first network node, a network function or support of the second network node for negotiating the common BDT policy applicable to both the first core network and the second core network.

18. The method of claim 8, wherein the first core network is a $5^{th}$ generation core network and the second core network is an evolved packet core network.

19. The method of claim 8, wherein the first network node is a service capability exposure function node or a network exposure function node, and the second network node is a common BDT negotiation network function node.

20. A method implemented in a telecommunication system, the telecommunication system comprising a first network node, a second network node and a third network node, the method comprising:

determining, by the first network node, that a background data transfer, BDT, policy is to be applied to both a first core network and a second core network;

in response to the BDT policy being determined to be applied to both the first core network and the second core network, transmitting, from the first network node to a second network node, a request for negotiating a common BDT policy applicable to both the first core network and the second core network;

receiving, at the second network node, a background data transfer, BDT, policy control create request from a first network node for negotiating a common BDT policy applicable to both a first core network and a second core network; and determining, by the second network node, common BDT policies applicable to both the first core network and the second core network;

receiving, at the third network node from the first network node, a network function discovery request for the second network node for negotiating a common background data transfer, BDT, policy applicable to both a first core network and a second core network; and transmitting, from the third network node to the first network node, a list of second network nodes.

* * * * *